United States Patent [19]

de Boer

[11] 4,117,509
[45] Sep. 26, 1978

[54] COLOR TELEVISION SYSTEM FOR RECORDING LINE SEQUENTIAL SIGNALS WITH 90° PHASE SHIFT

[75] Inventor: Eeltje de Boer, Eindhoven, Netherlands

[73] Assignee: U.S. Philips Corporation, New York, N.Y.

[21] Appl. No.: 741,238

[22] Filed: Nov. 12, 1976

[30] Foreign Application Priority Data

Sep. 20, 1976 [NL] Netherlands ............... 7610400

[51] Int. Cl.² ............... H04N 9/38; H04N 5/79
[52] U.S. Cl. ............................................. 358/4; 358/16
[58] Field of Search ............... 358/4, 8, 11, 14, 16

[56] References Cited

U.S. PATENT DOCUMENTS 3,716,656  2/1973  Lambert et al. ............... 358/11
3,968,513  7/1976  DeHaan ............................ 358/4

Primary Examiner—John C. Martin
Attorney, Agent, or Firm—Frank R. Trifari; Henry I. Steckler

[57] ABSTRACT

A system for recording a color television signal. The color information is recorded as an amplitude modulation. This color information consists of a first and a second color-difference signal, which two color-difference signals are transmitted in a line-sequentially alternating exhibiting a 90° phase-shift during consecutive line periods.

3 Claims, 7 Drawing Figures

|         | 1         | 2         | 3         | 4         | 5         | 6         |
|---------|-----------|-----------|-----------|-----------|-----------|-----------|
| C       | $(B-Y)_1$ | $(R-Y)_2$ | $(B-Y)_3$ | $(R-Y)_4$ | $(B-Y)_5$ | $(R-Y)_6$ |
| $E_c$ $E_{c1}$ | $(B-Y)_1$ | $(R-Y)_2$ | $(B-Y)_3$ | $(R-Y)_4$ | $(B-Y)_5$ | $(R-Y)_6$ |
| $E_{c2}$ |          | $(R-Y)_2$ $(B-Y)_1$ | $(R-Y)_2$ $(B-Y)_3$ | $(R-Y)_4$ $(B-Y)_3$ | $(R-Y)_4$ $(B-Y)_5$ | $(R-Y)_6$ $(B-Y)_5$ |
| $E_{c1}(\tau)$ |   | $-(B-Y)_1$ | $-(R-Y)_2$ | $-(B-Y)_3$ | $-(R-Y)_4$ | $-(B-Y)_5$ |
| $E_+$   |           | $(R-Y)_2$ $-(B-Y)_1$ | $(B-Y)_3$ $-(R-Y)_2$ | $(R-Y)_4$ $-(B-Y)_3$ | $(B-Y)_5$ $-(R-Y)_4$ | $(R-Y)_6$ $-(B-Y)_5$ |
| $E_-$   |           | $(R-Y)_2$ $(B-Y)_1$ | $(R-Y)_2$ $(B-Y)_3$ | $(R-Y)_4$ $(B-Y)_3$ | $(R-Y)_4$ $(B-Y)_5$ | $(R-Y)_6$ $(B-Y)_5$ |
| 38      |           | $(R-Y)_2$ | $(R-Y)_2$ | $(R-Y)_4$ | $(R-Y)_4$ | $(R-Y)_6$ |
| 39      |           | $(B-Y)_1$ | $(B-Y)_3$ | $(B-Y)_3$ | $(B-Y)_5$ | $(B-Y)_5$ |

Fig.4

|   | 1 | 2 | 3 | 4 | 5 |
|---|---|---|---|---|---|
| $C_1$ |  | $R_2$ | $B_2-B_3$ | $R_4$ | $B_4-B_5$ |
| $C_2$ |  | $R_1-R_2$ | $B_3$ | $R_3-R_4$ | $B_5$ |
| $E'_c$ | ↑$R_2$ →$R_1-R_2$ | ↑$B_2-B_3$ →$B_3$ | ↑$R_4$ →$R_3-R_4$ | ↑$B_4-B_5$ →$B_5$ |  |
| $C_3$ |  | $R_1-R_2$ | $B_3$ | $R_3-R_4$ | $B_5$ |
| $C_4$ |  | $R_2$ | $B_2-B_3$ | $R_4$ | $B_4-B_5$ |
| $C_5$ | $R_1-R_2$ | $B_3$ | $R_3-R_4$ | $B_5$ |  |
| $C_6$ | $R_2$ | $B_2-B_3$ | $R_4$ | $B_4-B_5$ |  |
| $C_7$ |  | $R_2$ | $B_3$ | $R_4$ | $B_5$ |
| $C_8$ | $R_1$ | $B_2$ | $R_3$ | $B_4$ |  |
| $C_9$ |  | $B_2$ | $B_3$ | $B_4$ | $B_5$ |
| $C_{10}$ | $R_1$ | $R_2$ | $R_3$ | $R_4$ |  |
| $E_{c3}$ |  | ↑$R_2$ →$B_2$ | ↑$R_3$ →$B_3$ | ↑$R_4$ →$B_4$ |  |

Fig. 7

COLOR TELEVISION SYSTEM FOR RECORDING LINE SEQUENTIAL SIGNALS WITH 90° PHASE SHIFT

The invention relates to a colour television system for the transmission of a colour television signal, in particular for recording such a signal on and reproducing it from a record carrier, which colour television signal contains the colour information as an amplitude modulation.

Especially when a record carrier is used as transmission medium the choice of the coding system, i.e. the structure of the colour television signal which has been recorded on said record carrier, is essential on the one hand a coding system is to be selected which is optimum in respect of the quality of the colour television signal to be reproduced, and on the other hand it is necessary to make allowance for the properties, in particular the imperfections, of the transmission medium, i.e. the record carrier, and the read apparatus for this medium.

A frequently utilized coding system is the so-called "direct system". According to this system a standard colour television signal, in particular a complete standard NTSC or PAL colour television signal is added to a carrier wave as a frequency modulation and is thus recorded on the record carrier. During read-out of such a record carrier the original standard colour television signal is recovered by frequency demodulation. The principal advantage of this coding system is that, because the original standard colour television signal is not affected, not the least limitation is introduced in respect of the bandwidth of the luminance signal and the chrominance signal contained in this colour television signal, whilst the two signal components always pass through the same signal paths.

Such a coding system imposes stringent requirements on the recording and reproducing apparatus and on the record carrier. In particular this coding system is highly susceptible to time errors. As is known, during reading of a record carrier time errors are introduced in the read-out signal inter alia owing to an irregular speed of transport of the record carrier along the read system and in the case of a disc-shaped record carrier owing to an eccentricity of the centre of rotation. In the said coding system such time errors greatly affect the quality of the reproduced colour signal. This is because in the recorded colour television signal the chrominance signal in accordance with the NTSC or PAL standard, consists of a quadrature-modulated chrominance carrier, i.e. a chrominance carrier which is amplitude modulated by two colour difference signals with modulation axes which are 90° shifted relative to each other. In such a signal time errors give rise to phase angle errors, which in the ultimately reproduced picture result in highly disturbing hue errors.

If such errors are to be avoided provisions for correcting these time errors must be made in the read apparatus for such a record carrier. For this purpose it is possible to employ a servo control by means of which the scanning position along the information track on the record carrier is controlled. In an optical read system for a disc-shaped record carrier an adjustable deflection element in the optical path is used for this purpose, which element then controls the position of the scanning spot along the information track. A second possibility of correcting these time errors is provided by variable delay networks such as bucket brigades, CCD's and the like. However, all these time error correction systems are still comparatively expensive, especially in the case of a read apparatus for pre-recorded record carriers, such as optically scanned video records, whose cost price is to be minimized, whereas such time error correction systems impose technologically high requirements.

It is an object of the invention to provide a transmission system which on the one hand is substantially less susceptible to time errors, and on the other hand is well compatible with the "direct" coding system. For this purpose the invention is characterized in that the colour information consists of a first and a second colour signal, which two colour signals are transmitted in a line-sequentially alternating fashion, the pulse angles of the modulated colour signals being 90° shifted during consecutive line periods.

As in the transmission system in accordance with the invention the colour signal is transmitted sequentially, this transmission system will be highly insusceptible to time errors. Since at any arbitrary instant only one colour vector is present in the recorded colour signal a phase shift of this colour vector owing to a time error after normal synchronous demodulation in the read apparatus merely gives rise to a minor saturation error of the relevant colour component. This means that when the transmission system in accordance with the invention is used comparatively great time errors are permissible without these errors giving rise to any, really disturbing colour errors in the reproduced colour television signal.

However, the transmission system in accordance with the invention has an additional advantage, which is especially of importance when prerecorded record carriers are used, i.e. record carriers which are provided with a programme by the manufacturer and which are purchased as such by the consumer. When the transmission system in accordance with the invention is utilized for this, a satisfactory compatability with the "direct" coding system, is obtained, in particular for PAL. The meaning of this term "compatibility" will become apparent from the following.

If it is assumed that the transmission system in accordance with the invention is employed for the said prerecorded video discs, it suffices, as previously stated, to use a read apparatus with little or no time error correction for the colour signal, In the course of time a comprehensive library of programmes recorded on this type of video discs would be available. If then after some time a "direct" coding system would be adopted, for example becuase the time error correction systems needed with such a coding system have been perfected and their cost price has substantially decreased, this will be possible without the video discs with the coding in accordance with the invention which are already on the market being rendered useless. On the contrary, such a video disc can readily be played on a player adapted to the "direct" PAL-system. In a similar way a video disc coded in accordance with the "direct" PAL-system can be played by a read apparatus utilizing the transmission system in accordance with the invention, although in that case the effect of time errors will be noticeable, for which purpose a separate time error correction device may then be incorporated.

An embodiment of the colour television system in accordance with the invention is characterized in that simultaneously with the first and the second colour signal a first and a second difference signal are transmitted respectively, the first colour signal together with the first difference signal as well as the second colour signal together with the second difference signal being quadrature-modulated and the first difference signal consisting of the difference between the value of one of the two colour signals which corresponds to the relevant line period and the value of this colour signal at the corresponding instant during the preceding or the next line period, whilst the second difference signal consists of the difference between the value of the other colour signal which corresponds to the relevant line period and the value of said other colour signal at the corresponding instant during the preceding or the next line period.

This embodiment has the advantage that it is essentially a simultaneous system, i.e. that for each picture element of the colour television picture to be reproduced two colour signals are available, whilst a television signal recorded in accordance with this system can be processed by means of a decoding circuit destined for the first-mentioned system with the associated advantage of insensitivity to time errors being maintained.

In respect of the design of the transmitter and receiver, or recording and read apparatus used in the colour television system in accordance with the invention many variants are possible.

Some possibilities will be described hereinafter with reference to the Figures, in which FIG. 1 shows a first example of a transmitter, and FIG. 2 shows a first example of a receiver for use in the colour television system in accordance with the invention.

FIG. 4 is a table of the signals appearing in the transmitter and receiver of FIGS. 1 and 2.

FIG. 7 is a table of the signals appearing therein.

Figure 1:
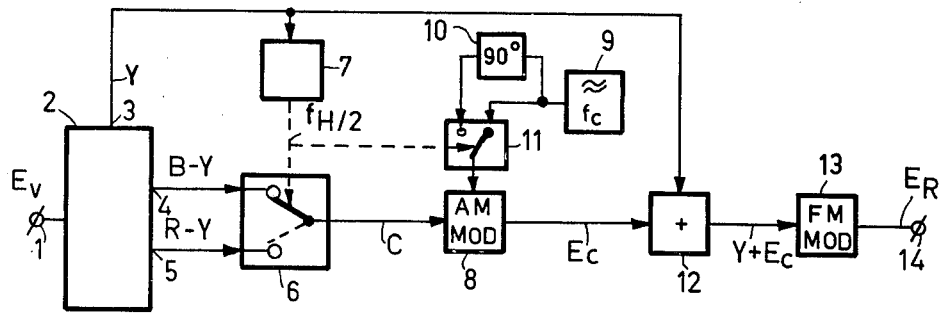

The apparatus shown in FIG. 1 for example forms part of a recording apparatus for recording a colour television signal on a record carrier and is adapted to transform an applied colour televsion signal into a colour television signal as used in the colour television system in accordance with the invention.

The shown apparatus first of all comprises a decoder 2, which derives the luminance signal Y and the two colour difference signals B-Y and R-Y from the applied colour television signal $E_y$. It will be evident that the circuit arrangement of this decoder 2 is to be adapted to the type of colour television signal which is applied to its input 1 and which may for example be a standard PAL or NTSC colour television signal. It is obvious that in the case of a programme which is recorded by means of a colour television camera this decoder may be dispensed with, because in that case the signals Y, (B-Y), and (R-Y) are directly available.

The two colour difference signals B-Y and R-Y at the output 4 and 5 respectively of the decoder 2 are applied to the two inputs of a switch 6. This switch 6 is controlled by a control unit 7, which is connected to the output 3 of the decoder 2 and consequently receives the luminance signal Y. This control unit 7 detects the line synchronizing pulses in said luminance signal in known manner and derives therefrom a symmetrical square-wave control signal with the frequency $f_H/2$, which is half the repetition frequency $f_H$ of the line synchronizing pulses. Owing to this control signal the position of the switch 6 changes line-sequentially, so that at the output of this switch 6 a colour signal C appears, which during consecutive line periods alternately consists of the colour difference signals (B-Y) and (R-Y). For the purpose of illustration the contents of this colour signal C during 6 consecutive line periods is indicated in the table of FIG. 4, the indexes indicating from which line period of the original colour television signal the relevant colour difference signal has been derived.

The colour signal C is applied to an amplitude modulator 8, for example an amplitude modulator with carrier suppression, in which this colour signal C is modulated on a carrier wave of the frequency $f_c$. This carrier wave is generated by an oscillator 9 whose output is connected both to a first input of a switch 11 and to a phase-shifting network 10, whose output is connected to a second input of the switch 11. This switch 11 is controlled by the control unit 7 in synchronism with the switch 6. Thus, it is achieved that the carrier wave which is supplied to the amplitude modulator 8 via this switch 11 is line sequentially subjected to a 90° phase-angle shift, so that the colour signal $E_c$ which appears at the output of said amplitude modulator 8 does not only contain the two colour-difference signals (B-Y) and (R-Y) line sequentially, but that in the vector diagram these colour difference signals have directions which are perpendicular to each other, as is indicated in the table of FIG. 4.

In the present example of the apparatus this modulated colour signal $E_c$ is recombined with the luminance signal Y by means of the adding circuit 12, after which the composite colour television signal Y + $E_c$ is applied to a frequency modulator 13 so as to obtain a signal $E_R$ at an output 14 which signal is suitable for recording on a record carrier. It is obvious that with respect to the combination of a colour signal and a luminance signal, so as to obtain a signal which is suitable for recording on a record carrier with limited bandwidth, i.e. in respect of the coding, many variants are known and the invention is by no means limited to the present example.

Figure 2:
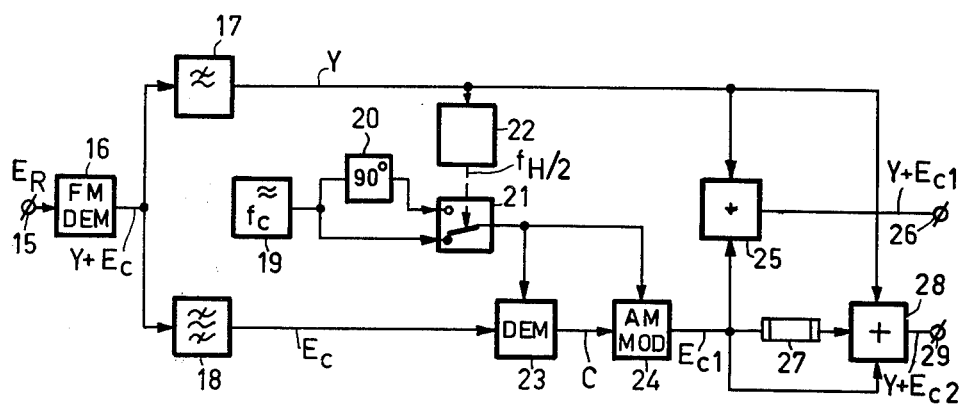

The apparatus shown in FIG. 2 will form part of the playing apparatus for the relevant record carrier. The input terminal 15 will be coupled to the pick-up element, which for example in the case of a magnetic record carrier will be a magnetic head and in the case of an optical record carrier a photodiode. Thus, the read-out signal is applied to this input terminal, said signal corresponding to the signal $E_R$. After demodulation with the aid of the frequency demodulator 16 the composite colour television signal Y + $E_c$ is obtained from which the luminance signal Y is extracted with the aid of a low-pass filter 17 and the colour signal $E_c$ with the aid of a band-pass filter 18.

This colour signal $E_c$ is applied to a synchornous demodulator 23, which furthermore receives a reference signal of a frequency $f_c$, which exhibits a line-sequential phase-shift of 90° and which is generated in an identical manner as the carrier wave in the apparatus of FIG. 1. The reference signal generated by the oscillator 19 is applied directly to a first input of a switch 21, and via a 90° phase-shifting network 20 to a second in-put of this switch 21. The switch 21 is controlled by a control unit 22, which causes said switch 21 to change over line-sequentially in synchronism with the line synchronizing pulses in the luminance signal Y which are detected by said control unit, so that said switch 21 supplies a reference signal to the demodulator 23 which line sequentially exhibits a 90° phase shift. This demodulator thus supplies a colour signal, which line-sequentially consists of the colour difference signals (B-Y) and (R-Y) and which in respect of its structure entirely corresponds to the colour signal C (FIG. 4). In order to ensure that the switching phase of the switch 21 is always correct, use can be made, in known manner of an identification signal which is transmitted with the colour television signal, which identification signal indicates which colour signal is present during a specific line interval and which after detection defines the associated position of the switch 21. As an example the standard PAL signal is mentioned, in which the phase of the colour burst signal functions as identification signal.

This demodulated colour signal C is subsequently applied to an amplitude modulator 24, which furthermore receives a carrier wave which corresponds to the reference signal for the demodulator 23, i.e. which also exhibits a phase angle which changes 90° line-sequentially. The colour signal $E_{c1}$ supplied by this modulator 24 consequently has the same structure as the original modulated colour signal $E_c$.

However, owing to the successive demodulation and modulation of the colour signal with the aid of the demodulator 23 and the modulator 24 the influence of time errors which have been introduced during transmission on the colour signal to be ultimately reproduced is substantially reduced. These time errors manifest themselves in the colour signal as phase-angle errors in the colour vector. These phase-angle errors would give rise to cross-talk between the two colour signals in the case of direct processing of the colour signal by for example a PAL receiver, so that substantial hue errors could occur in the reproduced picture. This cross-talk is completely avoided by the successive demodulation and modulation, so that time errors can only give rise to a saturation error in the two colour signals, said saturation errors being only very small for the phase angle errors which normally occur.

Figure 3:
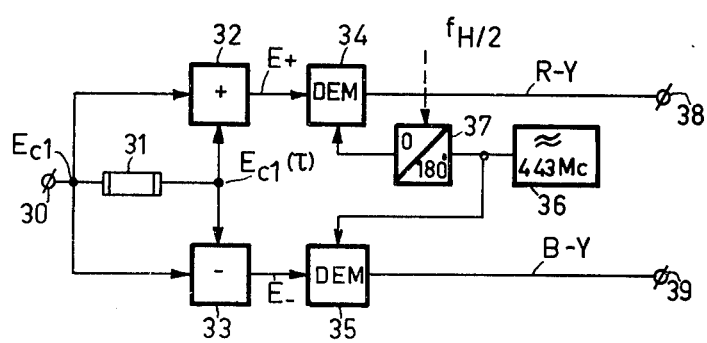
FIG. 3 shows a part of a PAL-receiver for the purpose of illustration.

The colour signal $E_{c1}$ supplied by the amplitude modulator 24 is added to the luminance signal Y in the adding device 25 and the composite colour television signal $Y + E_{c1}$ thus obtained is available at an output terminal 26. This colour television signal $Y + E_{c1}$ is suitable for application to a PAL receiver. It is obvious that the frequency $f_c$ of the carrier wave for the modulator 24 should be selected equal to the frequency of the PAL colour such carrier, i.e. 4.43 MHz. In order to demonstrate that the colour signal $E_{c1}$ is suitable for reproduction via a PAL receiver. FIG. 3 shows the colour demodulation device commonly used in a PAL receiver. This device, in known manner, comprises a delay line 31, which delays the applied colour signal $E_{c1}$ by one line period and moreover produces a 180° phase shift, which results in a delayed colour signal $E_{c1}(\tau)$ as indicated in the table of FIG. 4. The device furthermore includes an adder circuit 32, which supplies a colour signal $E_+ = E_{c1} + E_{c1}(\tau)$ and a subtractor circuit 33, which supplies a colour signal $E_- = E_{c1} - E_{c1}(\tau)$ (see FIG. 4). finally the device also includes two synchronous demodulators 34 and 35, which receive the colour signal $E_+$ and $'E_-$ respectively and which furthermore receive a reference signal with the frequency of 4.43 MHz from an oscillator 36, said reference signal for the demodulator 34 exhibiting a line-sequential phase-shift of 180°, which is realized with the aid of the circuit 37, which in known manner consists of a 180° phase-shifting network and a switch which changes over line-sequentially. It is then evident that the demodulator 34 during each line supplies the (R-Y) colour signal and the demodulator 35 the (B-Y) colour signal, which two colour signals are available at the terminals 38 and 39 respectively (see FIG. 4). This is entirely in agreement with the break-up of a PAL colour television signal into the (R-Y) and (B-Y) colour signals in the PAL receiver.

The only deviation which occurs concerns the amplitude of the resulting colour signals. Owing to the line-sequential structure of the colour television signal used in the system in accordance with the invention the amplitude of the colour signals which are available at the terminal 38 and 39 would be half that of the colour signal appearing at said terminals if a normal PAL colour television signal were used. However, when using the system in accordance with the invention the amplitude of the colour signals may be selected a factor 1.4 greater than that of a PAL signal during recording, without departing from the PAL standard specifications in respect of the magnitude of the transmitted signals. In addition, the residual amplitude error in the receiver may be compensated for by accordingly reducing the pilot signal for the automatic gain control, which pilot signal is generally constituted by the amplitude of the colour burst. Thus, the gain in the receiver will increase and the amplitude of the colour signals can be increased to the normal value.

FIG. 2 also shows how the modulated colour signal $E_{c1}$ at the output of the modulator 24 can be rendered suitable for reproduction via a NTSC receiver. For this, it is of course assumed that the frequency of the colour carrier wave $f_c$ now equals that of the NTSC colour subcarrier, namely approx. 3.6 MHz. In the case that the recording on the record carrier has the NTSC coding this is of course so. However, it is also possible to change from a record carrier with $f_c = 4.43$ MHZ in accordance with the PAL system to the NTSC system. For this purpose, it is only necessary after demodulation with the aid of the reference signal with the frequency $f_c = 4.43$ MHz in the demodulator 23 to apply a carrier wave with the frequency 3.6 MHz to the following modulator 24. In FIG. 2 this means the inclusion of an additional oscillator with associated 90° phase-shifting network and line-sequentially operated switch.

The resulting colour signal $E_{c1}$ is now delayed by one line period with the aid of the delay line 27 and added to the undelayed colour signal $E_{c1}$ in the adding circuit 28, which results in a colour signal $E_{c2}$ at the terminal 29, which has a structure as shown in FIG. 4. The structure of this colour signal entirely corresponds to that of an NTSC colour signal and the signals are therefore suitable to be applied to an NTSC receiver.

Figure 5:
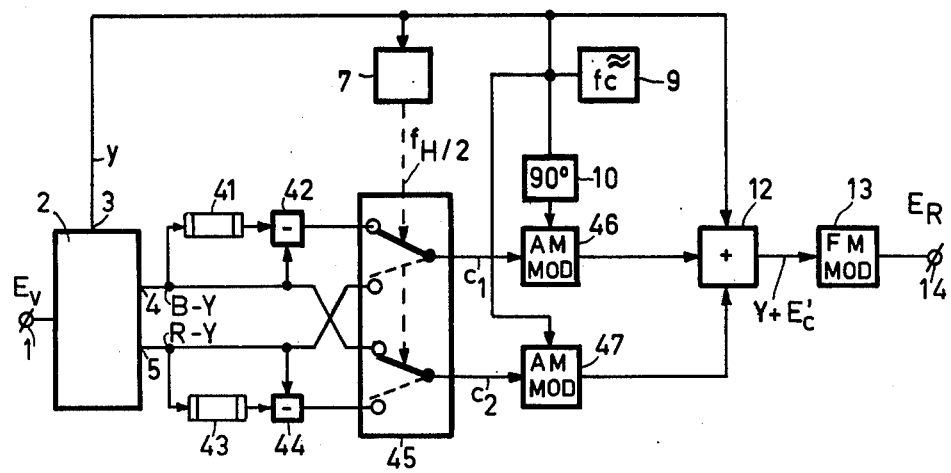
FIG. 5 shows a second example of the transmitter.

FIG. 5 shows a second example of a coding device, corresponding elements bearing the same reference numerals as in FIG. 1. A standard colour television signal $E_v$ is again split up into the luminance signal Y and the colour difference signals (R-Y) and (B-Y) with the aid of the decoder 2. The colour difference signal (B-Y) is applied to a delay line 41, which introduces a delay equal to one line period, after which the delayed signal is applied to a subtractor circuit 42, which circuit also receives the undelayed colour difference signal (B-Y) from the decoder 2. Thus, a signal which is equal to the difference between the colour-difference signals of two consecutive picture lines appears at the output of this subtractor circuit 42. In a similar way the colour difference signal R-Y is delayed with the aid of a delay line 43, after which with the aid of the subtractor circuit 44 the difference is determined between the colour difference signals of two consecutive picture lines. When starting from a composite colour television signal $E_v$ in accordance with the PAL or NTSC standard, the composite colour signal can be delayed by one line period with the aid of one delay line, after which the two delayed and the two undelayed colour signals can be obtained by synchronous demodulation. In that case only one delay line is needed.

The coding device furthermore comprises a switching device 45 which includes a first and a second switch, which are fully interlocked and lines sequentially controlled by the control unit 7. The two inputs of the first switch are respectively connected to the subtractor circuit 42 and to the output 5 of the decoder, whilst the two inputs of the second switch are respectively connected to the output 4 of the decoder 2 and to the subtractor circuit 44. Owing to the line sequential actuation of the two switches of the switching device 45 the colour signals $C_1$ and $C_2$ respectively are obtained at the two outputs of this switching device, which signals have a structure as is indicated for a number of consecutive picture lines in the table of FIG. 7. In this table the indications R and B instead of (R-Y) and (B-Y) respectively are used for the sake of simplicity.

These two colour signals $C_1$ and $C_2$ are modulated on a carrier wave with a frequency $f_c$ in an AM modulator 46 and 47 respectively, which carrier wave is generated by the oscillator 9. The carrier wave for the modulator 46 has a phase angle which is 90° shifted relative to the carrier wave for the modulator 47, which is realized with the aid of the phase shifting network 10. The colour signals thus modulated are added to each other in an adding device 12 and added to the luminance signal Y. The colour signal $E'_c$ then has the structure of FIG. 7 and thus contains one of the two colour difference signals (R-Y) or (B-Y) during each line period and in addition thereto the difference of the relevant colour difference signals in two consecutive line periods. However, it is equally possible to record the second difference signal simultaneously with the first colour signal (R-Y) and the first difference signal simultaneously with the second colour signal (B-Y). The composite colour television signal Y + $E'_c$ is again frequency modulated in the modulator 13 and the signal $E_R$ at the output terminal 14 is recorded on the record carrier.

Figure 6:
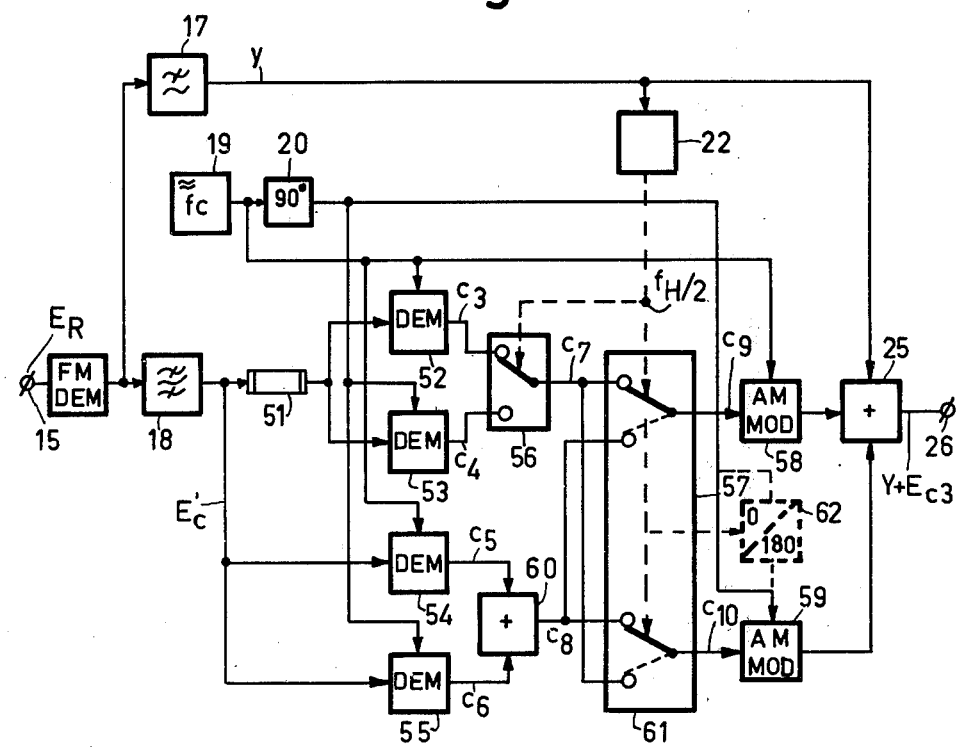
FIG. 6 shows a second example of the receiver.

FIG. 6 shows the decoding device for a colour television signal $E_R$ which is coded in such a manner. The read-out signal $E_R$ is demodulated in the FM demodulator 15, after which with the aid of the low-pass filter 17 and the band-pass filter 18 the luminance signal Y and the colour signal $E'_c$ are extracted from the demodulated signal.

The colour signal $E'_c$ is fed to a delay line 51, which introduces a delay of one line period. The delayed colour signal is subsequently applied to two synchronous demodulators 52 and 53 which receive a reference signal with a frequency $f_c$ from the oscillator 19, the reference signal for the demodulator 53 being 90° phase-shifted with the aid of the phase-shifting network 20. These two demoduators 52 and 53 consequently provide a colour signal $C_3$ and $C_4$ respectively having a structure as indicated in the table of FIG. 7.

The colour signal $E'_c$ which has been extracted by means of the filter 18 is also applied directly to two synchronous demodulators 54 and 55, which again receive two reference signals with the frequency $f_c$ and with a 90° phase-shift relative to each other. These two demodulators 54 and 55 consequently supply the colour signals $C_5$ and $C_6$ respectively with the structure indicated in the table of FIG. 7. These two colour signals $C_5$ and $C_6$ are added to each other in an adder circuit 60, yielding the colour signal $C_8$.

The two colour signals $C_1$ and $C_2$ are applied to the two inputs of a switch 56, which switch is controlled by the control unit and is changed over line-sequentially, which results in a colour signal $C_7$ at the output of this switch 56. This colour signal $C_7$ and the colour signal $C_8$ are applied to a switching device 61, which comprises two switches which are controlled by the control unit 22 and which consequently change over line sequentially. At the two outputs of this switching device 61 this results in two colour signals $C_9$ and $C_{10}$ respectively with the structure indicated in the table of FIG. 7, the colour signal $C_9$ continuously representing (B-Y) signal and the colour signal $C_{10}$ continuously representing the (R-Y) signal. These two colour signals $C_9$ and $C_{10}$ are quadrature modulated on a carrier wave of the frequency $f_c$ with the aid of the modulators 58 and 59 which receive two carrier waves of the frequency $f_c$ and with phase angles which differ 90° from each other. The signals thus modulated are added to each other and combined with the luminance signal Y in the adder circuit 25, so that a composite colour television signal Y + $E_{c3}$ becomes available at the output terminal 26, which signal is completely adapted to be applied to an NTSC receiver, because the colour signal $E_{c3}$ (see FIG. 7) has a structure in accordance with the NTSC system. If a signal suitable for a PAL receiver is required, the (R-Y) vector in the colour signal $E_{c3}$ must be inverted line-sequentially. For this purpose it suffices to apply the carrier wave with the frequency $f_c$ to the modulator 59 via a network which in a line-sequentially alternating fashion produces a phase shift of 0° and 180° in accordance with the network 37 in FIG. 3. For illustration such a network is represented by the dashed lines in FIG. 6 bearing the reference numeral 62.

If the difference signal $B_1-B_2$ is transmitted simultaneously with the colour signal $R_2$ and the difference signal $B_2-B_3$ simultaneously with the colour signal $R_3$ etc., the reproducing device of FIG. 6 will have to be adapted, which adaptation is self-evident. The same applies if simultaneously with the colour signal $R_2$ the difference signal $R_2-R_3$ etc. is transmitted.

The advantage of this transmission system can best be explained on the basis of a record carrier, for example a video record, provided with a programme for which the specified coding is employed. Such a record carrier can readily be played on a playing apparatus, which includes a decoding device in accordance with FIG. 2. When this decoding device is used the system will be highly insusceptible to time errors, as has been demonstrated hereinbefore. However, the same record carrier may also be played on a playing apparatus which incorporates the decoding device in accordance with FIG. 6. It is true that the system is then no longer insensitive to time errors, so that a time error correction device is required, but on the other hand a simultaneous colour system is then obtained in which both colour signals belonging to one line period are transmitted.

What is claimed is:

1. A colour television system for recording a colour television signal, which colour television signal contains the colour information as first and second amplitude modulated colour signals, said system comprising means for recording said two colour signals in a line-sequentially alternating fashion, the phase angle of the modulated colour signals being 90° shifted during consecutive line periods and means for recording simultaneously with the first and the second colour signals a first and a second difference signal respectively, the first colour signal together with the first difference signal as well as the second colour signal together with the second difference signal being quadrature modulated, the first difference signal comprising the difference between the value of one of the two signals during a selected line period and the value of this colour signal at the corresponding instant during the preceding or the next line period, the second difference signal comprising the difference between the value of the other colour signal during a selected line period and the value of said other colour signal at the corresponding instant during the preceding or the next line period.

2. A recording system as claimed in claim 1, wherein said recording means together comprise a first delay line means for delaying the first colour signal by one line period, a first subtractor circuit means for supplying a first difference signal corresponding to the difference between the first colour signal and the delayed first colour signal, a second delay line means for delaying the second colour signal by one line period, a second subtractor circuit means for supplying a second difference signal corresponding to the difference between the second colour signal and the delayed second colour signal, a first and a second amplitude-modulator which receive a colour carrier wave of the same frequency and with a 90° phase-shift relative to each other, and a switching device means for applying the first colour signal and one of the two difference signals to the first modulator in a line-sequentially alternating fashion and for applying the other difference signal and the second colour signal to the second modulator in a line-sequentially alternating fashion.

3. A color television system for reproducing a color television signal, said color television signal comprising the color information as first and second color amplitude modulated signals, said two color signals being recorded in a line-sequentially alternating fashion, the phase angle of the modulated color signals being 90° shifted during consecutive line periods, simultaneously with the first and the second color signals a first and a second difference signal being recorded respectively, the first color signal together with the first difference signal as well as the second color signal together with the second difference signal being quadrature modulated, the first difference signal comprising the difference between the value of one of the two color signals during a selected line period and the value of this color signal at the corresponding instant during the preceding or the next line period, the second difference signal comprising the difference between the value of the other color signal during a selected line period and the value of said other color signal at the corresponding instant during the preceding or the next line period, said reproducing system comprising a delay line means for delaying the modulated color carrier wave by one line period, a first and second synchronous demodulator, means connected to said delay line for demodulating the two quadrature components in the delayed modulated carrier wave, a third and fourth synchronous demodulator means for demodulating the two quadrature components in the undelayed modulated carrier wave, a recombination circuit means for recombining the output signals of the four synchronous demodulators for obtaining a first signal which continuously corresponds to the first color signal and a second signal which continuously corresponds to the second color signal.

* * * * *